(12) United States Patent
Chien (10) Patent No.: US 6,480,306 B1
(45) Date of Patent: Nov. 12, 2002

(54) SCANNING APPARATUS AND METHOD FOR OBTAINING THE GRAY LEVEL OF A SCANNED OBJECT THEREIN

(75) Inventor: Hung-Chan Chien, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/317,216

(22) Filed: May 24, 1999

(51) Int. Cl.[7] .................................................. H04N 1/46
(52) U.S. Cl. ...................................... 358/509; 358/500
(58) Field of Search ................................. 358/400, 401, 358/474, 452, 455, 461, 406, 443, 500, 509

(56) References Cited

U.S. PATENT DOCUMENTS 4,760,444 A * 7/1988 Neilson ...................... 358/101

* cited by examiner

Primary Examiner—Jerome Grant, II
(74) Attorney, Agent, or Firm—Nath & Associates PLLC; Harold L. Novick; Marvin C. Berkowitz (57) ABSTRACT

A method of obtaining the gray level of a scanned object, comprising the steps of: providing at least three corrective elements, wherein each of the corrective elements has different light reflectivity, and the gray levels of the corrective elements are pre-defined and pre-stored; scanning those corrective elements to obtain the light reflectivities of each of the corrective elements; scanning the object to obtain its light reflectivity; comparing the light reflectivity of the object with the light reflectivity of each of the corrective elements to determine two corrective elements whose light reflectivities are closer to the light reflectivity of the object; and using the light reflectivities of the two determined corrective elements and their corresponding gray levels in conjunction with the interpolation method to determine the corresponding gray levels of the object.

20 Claims, 6 Drawing Sheets

SCANNING APPARATUS AND METHOD FOR OBTAINING THE GRAY LEVEL OF A SCANNED OBJECT THEREIN

BACKGROUND OF THE INVENTION

1. Field of the Invention

The present invention generally relates to a scanning apparatus and a method for obtaining the gray level of a scanned object therein, and more specifically by using at least three corrective elements provided inside the scanning apparatus with different light reflectivies in conjunction with interpolation method.

2. Description of the Related Art

In general, a scanning apparatus includes an image sensor comprised in an image sensor module. The image sensor has a plurality of pixel sensors to receive the light reflected from the scanned object and convert the received light into an analog electric signal representing the light reflectivity of the scanned object. Then an analog-to-digital(A/D) converter converts the analog electrical signal into a digital response representing the gray level of the scanned object for further processing.

Figure 5:
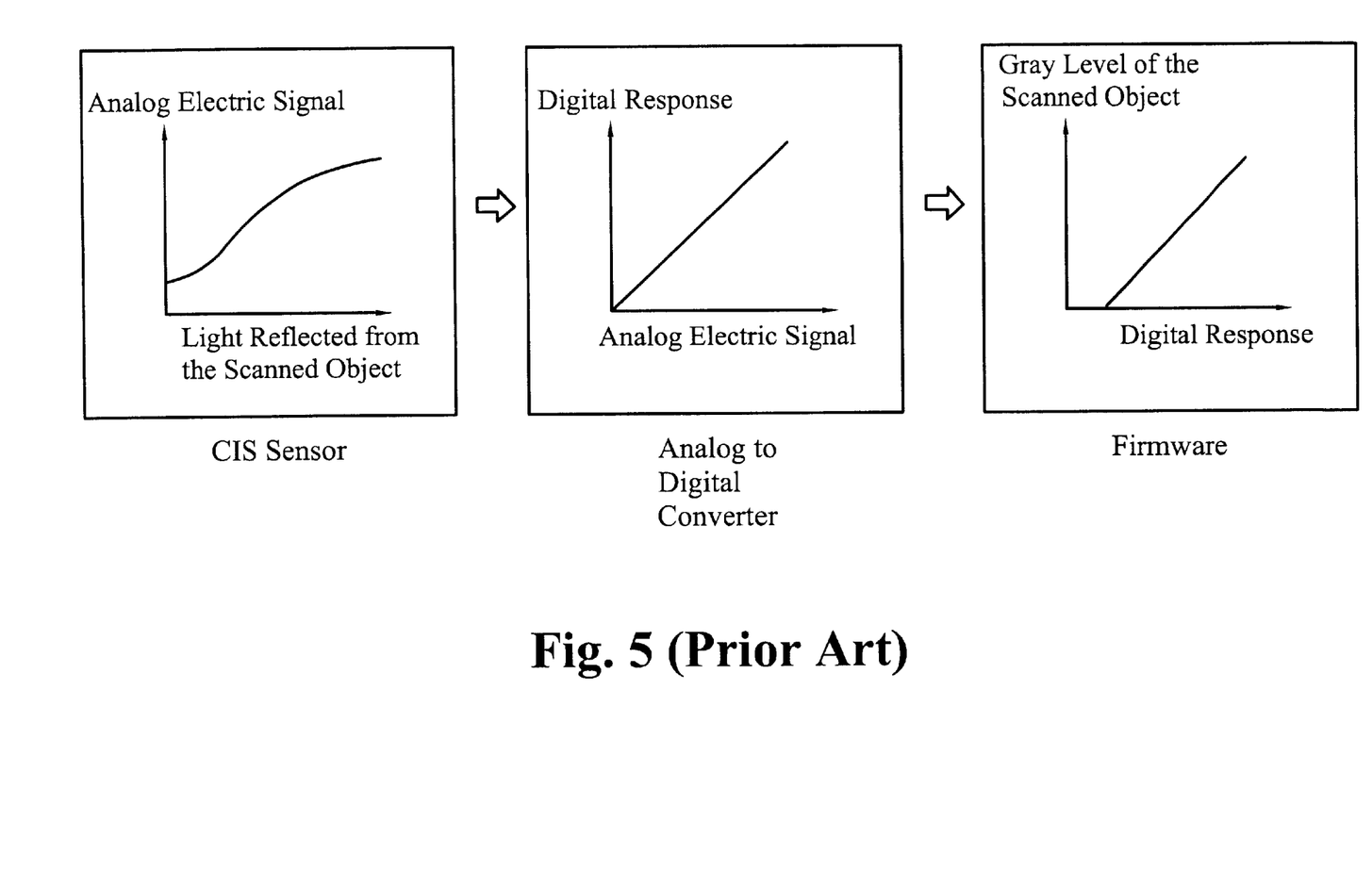
FIG. 5 illustrates the conventional method applied for obtaining the gray level of a scanned object in a scanning apparatus.

Referring to FIG. 5, a conventional method for obtaining the gray level of a scanned object in a scanning apparatus is illustrated.

Figure 1:
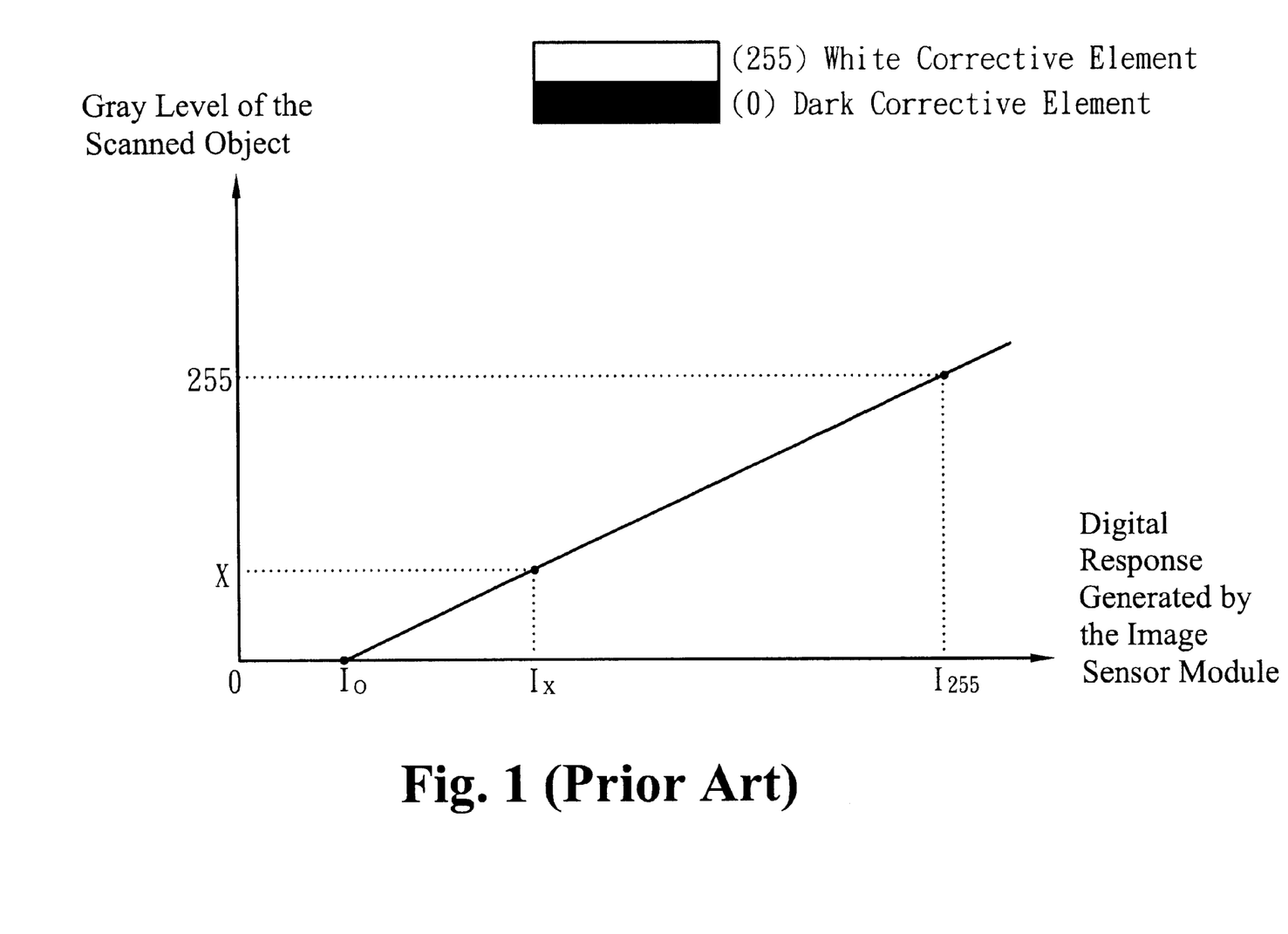
FIG. 1 illustrates how the digital response generated by the A/D converter in the image sensor module is converted into the gray level of the scanned object according to the convention method for a scanning apparatus of 8-bit resolution.

For a contact image sensor (CIS) scanner, the image sensor (CIS) is installed in a CIS module. To transform the received light into a corresponding gray level, first the analog electric signal generated by the CIS is converted into a digital response through a linear A/D converter, then a compensating firmware is used to fine tune the final gray level value. In the prior art, two corrective elements (white and dark) are used in the compensating firmware. FIG. 1 illustrates a conventional compensating firmware for converting the digital response generated by the image sensor module into a gray level representing the light reflectivity of the scanned object in a scanner of 8-bit resolution. In FIG. 1, the gray level of the white corrective element is defined as "255" and that of the dark corrective element is defined as "0", thereby the range of the gray level of a scanned image is determined. When scanning an object, the CIS module first scans the white and dark corrective elements to obtain and store the values ($I_{255}$, $I_0$) of the digital responses generated by the CIS module (including a contact image sensor and a A/D converter) representing the light reflectivities of the two corrective elements respectively. Then, the CIS module scans an object, if the digital response corresponding to the light reflectivity of the scanned object is $I_x$, the corresponding gray level x of the scanned object can be determined according to the following equations:

$$x = 0 \quad \text{(if } I_x < I_0\text{)};$$
$$x = \frac{255 - 0}{I_{255} - I_0} \times (I_x - I_0) + 0 \quad \text{(if } I_0 \leq I_x \leq I_{255}\text{)};$$
$$x = 255 \quad \text{(if } I_x > I_{255}\text{)}.$$

In accordance with the conventional art, if the image sensor can convert the light reflectivity of the scanned object into an analog electric signal in a linear way, such converting method will be accurate. However, due to the non-linear transfer curve of CIS, CIS can not convert the light reflectivity into an analog electric signal in a linear way.

Figure 2:
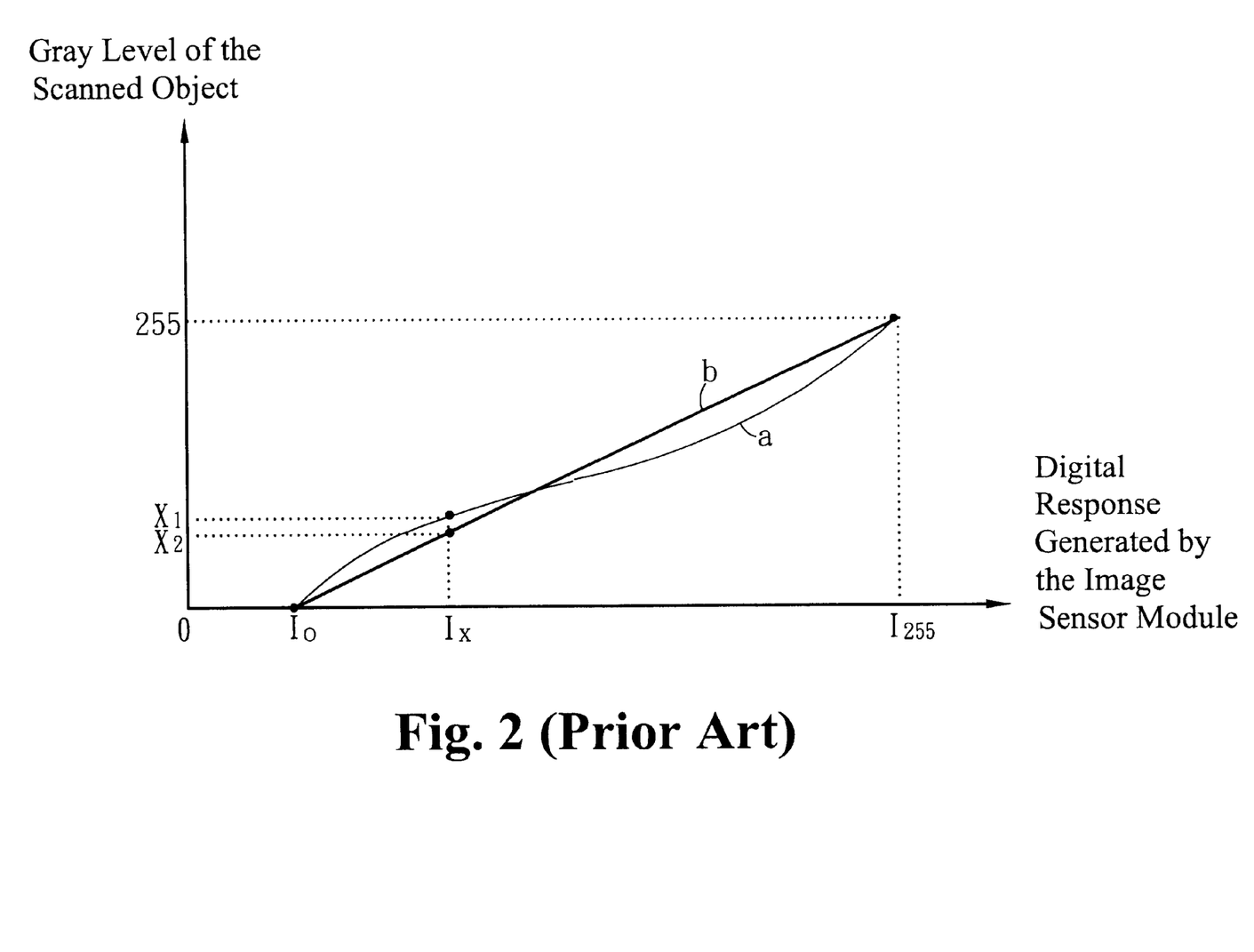
FIG. 2 illustrates the non-linear relation between the value of the digital response generated by the image sensor module and the gray level of a scanned object, and the conventional transfer curve in the firmware of a scanning apparatus with 8-bit resolution.

FIG. 2 illustrates the transfer curve in the firmware of a conventional scanning apparatus with 8-bit resolution. The combination transfer curve for a "non-linear CIS sensor" with a "linear A/D converter" under a fixed exposure time is shown as curve a. As the conventional firmware transfer curve, the two corrective elements define a linear segment b. Apparently, the digital response generated by the curve a could not be accurately compensated by the straight line b.

Please refer to FIG. 2, assume the actual gray level of the scanned object is $X_1$, an digital response $I_x$ will be generated through the transfer curve a. According to the conventional firmware defined by only white and dark corrective elements (straight line b), based on the digital response $I_x$, the converted gray level would be $X_2$. The difference between $X_2$ and $X_1$ will degrade the scanning quality and thus affect the performance of the CIS scanner.

SUMMARY OF THE INVENTION

Therefore, an object of the present invention is to provide a method for a scanning apparatus to compensate the non-linearity between the analog electric signal generated by the image sensor and the actual gray level of the scanned object. A scanning apparatus for implementing such method will also be disclosed.

One embodiment of the present invention comprises the steps of: providing three corrective elements, wherein each of the corrective elements has a different light reflectivity, and the corresponding gray levels of the three corrective elements are pre-defined and pre-stored in the scanning apparatus; scanning each of the corrective elements to obtain three corresponding values of the digital responses generated by the CIS module; scanning an object to obtain the digital response generated by the CIS module; comparing the digital response value of the scanned object with the digital response values of each of the corrective elements to determine two corrective elements whose digital response values are closest to the digital response value of the scanned object; and, using the digital response values of the two determined corrective elements and their corresponding gray levels in conjunction with the interpolation method to determine the corresponding gray level of the scanned object.

Operating in conjunction with the method described above, a scanning apparatus for scanning an object is also disclosed. The scanning apparatus at least comprises: an image sensor module; at least three corrective elements; and a processing unit.

The image sensor module, for example is a contact image sensor, comprises a contact image sensor (CIS) and an anlog-to-digital converter (A/D converter) The CIS receives a light reflected from the scanned object and generates an analog electric signal representing the light reflectivity of the object. The A/D converter converts the analog electric signal into a digital response.

The three corrective elements have different light reflectivity, whose corresponding gray levels are pre-defined and pre-stored in the scanning apparatus. Moreover, the corrective elements are scanned by the image sensor module during a scanning process, thereby the light reflectivities of each of the corrective elements are obtained.

The processing unit will then convert the light reflectivity of the object into a corresponding gray level of the object according to the light reflectivities of each of the corrective elements.

According to one embodiment, the image sensor module has a non-linear transfer curve to convert the received light into a digital response. The transfer curve has a first deviated node and a second deviated node. The method comprises the steps of:

(1) obtaining the minimum digital response generated by the image sensor module by blocking all light from being received by the image sensor module, the corresponding gray level of the minimum digital response being defined as the minimum gray level "0";

(2) providing a first corrective element whose gray level being defined as the maximum gray level, and a first digital response being generated by said image sensor module when the first corrective element is scanned;

(3) providing a second corrective element whose gray level being corresponding to the first deviated node of the transfer curve, and the second digital response being generated by the image sensor module when the second corrective element is scanned;

(4) providing a third corrective element whose gray level being corresponding to the second deviated node of the transfer curve, and the third digital response being generated by the image sensor module when scanning the third corrective element;

(5) scanning the object to obtain the object digital response generated by the image sensor module;

(6) selecting two digital responses from the first, second, third, and minimum digital responses, wherein the values of the two selected digital responses are closer to the object digital response; and (7) using the object digital response, two selected digital response, and the gray levels corresponding to the selected digital responses in conjunction with the linear interpolation method to determine the corresponding gray levels of said object.

Further features and advantages of the present invention, as well as the structure and operation of various embodiments of the present invention, are described in details below with respect to the accompanying drawings. In the drawings, same reference numbers indicate identical or functionally similar elements.

BRIEF DESCRIPTION OF THE DRAWINGS

The present invention will be best understood in conjunction with the accompanying drawings, in which.

DETAILED DESCRIPTION OF THE PREFERRED EMBODIMENTS

Figure 4:
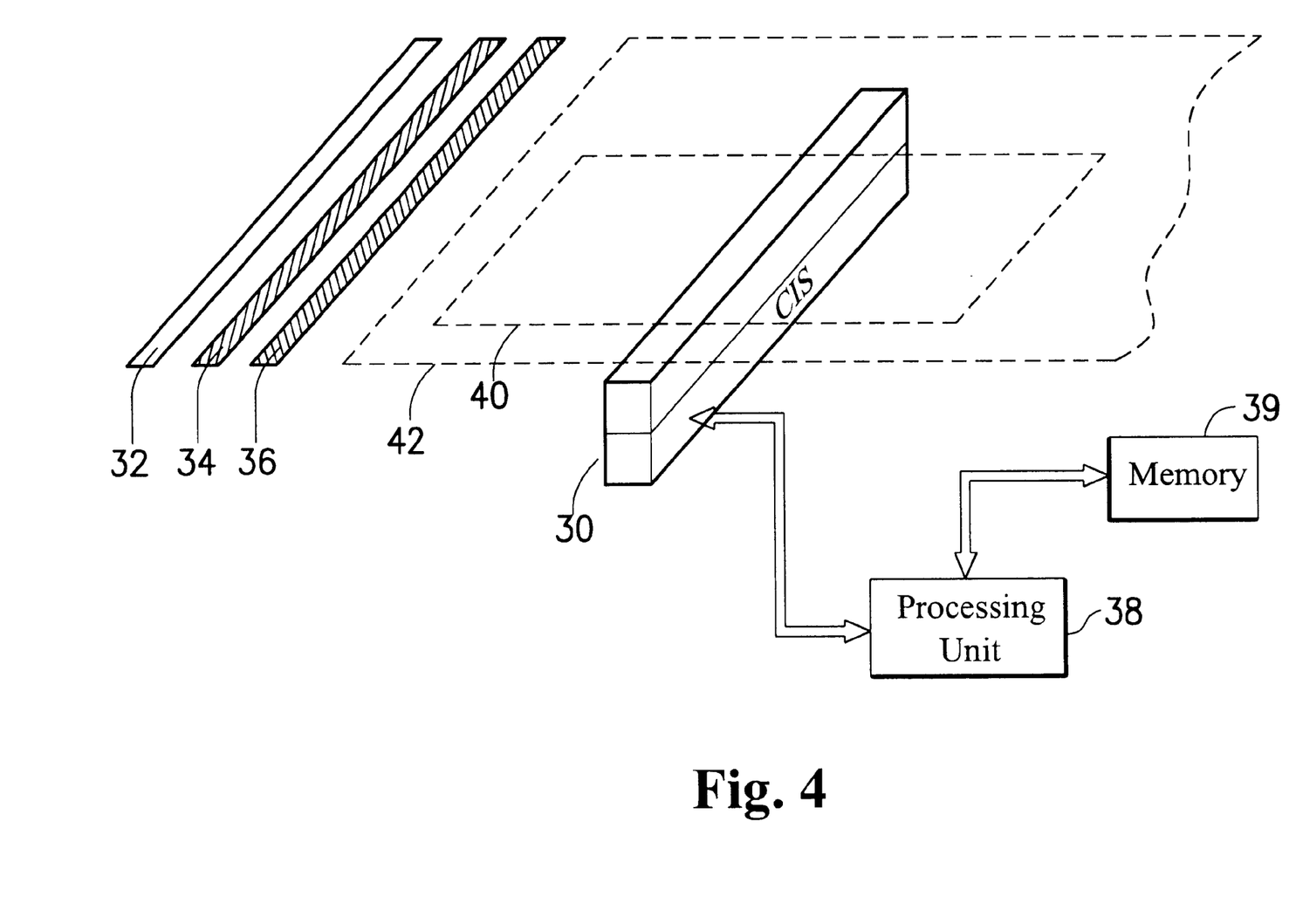
FIG. 4 illustrates a block diagram of a scanning apparatus with three corrective element according to the present invention.

FIG. 4 illustrates a block diagram of a scanning apparatus with three corrective element according to the present invention.

Referring to FIG. 4, the scanning apparatus, at least comprises: an CIS module 30; three corrective elements (32, 34, and 36); a processing unit 38, and a memory 39.

The CIS module 30 comprises a CIS (contact image sensor) and a A/D converter. The CIS receives a light reflected from the scanned object 40 and generates an analog electric signal. Through the A/D converter, the analog signal is converted into a digital response $I_x$ representing the light reflectivity of the object. It should be noted that the A/D converter could also be implemented outside the CIS module 30.

The corrective elements (white 32, gray 34, and dark 36) have different light reflectivities, whose corresponding gray levels are pre defined and pre-stored in the memory 39 of the scanning apparatus. In a preferred embodiment, the corrective elements are disposed along the scanning path of the CIS module 30 next to the document supporting glass 42.

According to this embodiment, when the scanner is about to scan an object 40, the CIS module 30 first moves along the scanning path to scan the three corrective elements (white 32, gray 34, and dark 36). The digital responses generated by each pixel sensor of the CIS module 30 corresponding to each of the corrective elements are thus obtained and will be stored in the memory 39. The CIS module 30 then moves along the scanning path to scan the object 40 to obtain the digital response $I_x$ of the object 40. Based on the saved digital response of each of the corrective elements, the processing unit 38 then converts the digital response $I_x$ into a corresponding gray level of the object 40 according to a firmware.

The operation details of this scanner according to the present invention will be described hereinafter.

Figure 3:
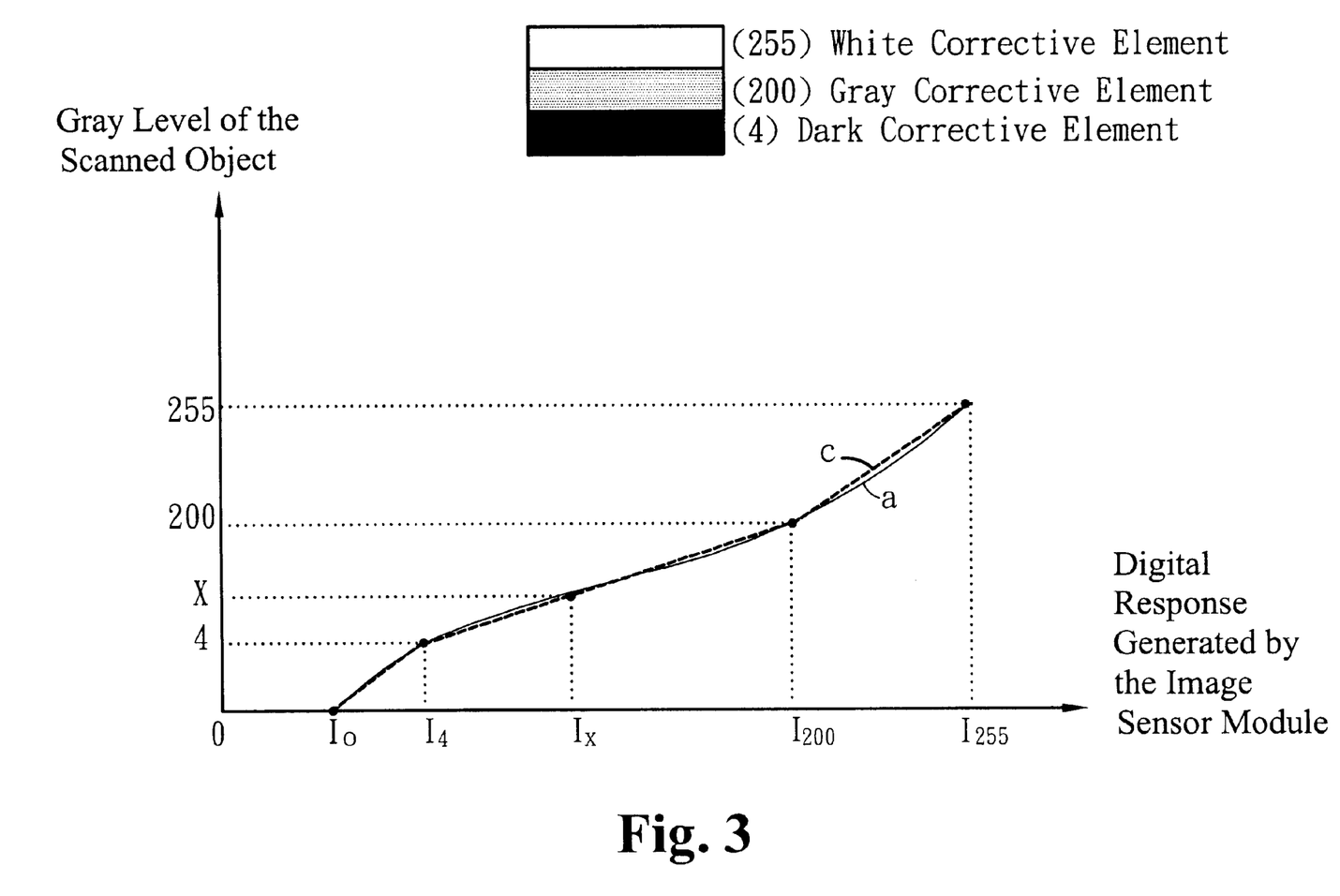
FIG. 3 illustrates the non-linear relation between the value of the digital response generated by the image sensor module and the gray level of a scanned object, and the transfer curve in the firmware of a scanning apparatus with 8-bit resolution according to the present invention.

Please refer to FIG. 3. Curve a indicates the non-linear relation between the value of the digital response generated by the image sensor module and the gray level of a scanned object; line c indicates the transfer curve in the firmware of a scanning apparatus with 8-bit resolution according to the present invention. In this embodiment, the deviated nodes (curved points) of the transfer curve for each pixel sensor of this CIS module 30 are obtained through experiment, and are approximately at gray level "4" and "200". It should be noted that the deviated nodes for all pixel sensors in one CIS module are different but should be close to each other.

According to the embodiment, a white, a gray, and a dark corrective elements (32, 34, and 36) are provided inside the scanning apparatus. The light reflectivity of these three corrective elements are different, and the gray levels of these corrective elements are pre-defined and pre-stored in the memory 39 of the scanning apparatus. When all nearby light sources are blocked such that the image sensor module senses or receives no light, the minimum analog electric signal generated by the pixel sensor is obtained. The corresponding digital response from pixel sensor 1 is pre-stored in the memory as $I_0$ and its corresponding gray level is defined as minimum gray level "0". The gray level of the white corrective element 32 is defined as the maximum gray level "255", and its corresponding digital response from pixel sensor 1 is saved as $I_{255}$. Corresponding to the first deviated node, a corrective element whose gray level equals to gray level "200" is chosen as the gray corrective element 34, and its corresponding digital response from pixel sensor 1 is saved as $I_{200}$. Corresponding to the second deviated node, a corrective element whose gray level equals to gray level "4" is chosen as the dark corrective element 36, and its corresponding digital response from pixel sensor 1 is saved as $I_4$. Provided that the CIS module has 600 pixels and the above procedure is performed for all pixel sensors, and the $I_0$, $I_4$, $I_{200}$, $I_{255}$ are stored in memory 39 for all pixel sensors 1~600 respectively.

To simplify the explanation, we will focus the discussion on pixel sensor 1 only, but the following procedure is actually performed for all pixel sensors (sensor 1~600). When the scanner begins scanning an object, the three corrective elements (32, 34, 36) are first scanned by the CIS module 30 in the scanning apparatus. The CIS module 30 receives the light reflected from the three corrective elements, senses the light reflectivities of the three corrective elements, and generates corresponding digital responses representing their light reflectivities respectively. These values will be stored in a memory 39 in the scanner. In this embodiment, the values of the digital responses generated by the CIS module 30 are $I_{255}$, $I_{200}$, $I_4$, $I_0$ respectively.

Based on the four pre-stored response points $I_{255}$, $I_{200}$, $I_4$, and $I_0$, three linear segments of the firmware transfer curve are defined. The three linear segments are (0, $I_0$) to (4, $I_4$), (4, $I_4$) to (200, $I_{200}$), and (200, $I_{200}$) to (255, $I_{255}$) respectively.

Next, the CIS module 30 scans an object and obtains the digital response $I_x$ for pixel sensor 1 of the scanned object.

The value $I_x$ of the scanned object is compared with the values $I_0$, $I_4$, $I_{200}$, $I_{255}$, and to determine which linear range the $I_x$ is located. Two pre-stored response points which are closer to the $I_x$ are selected.

Then, the digital response of the two selected corrective elements and their corresponding gray levels are used in conjunction with the linear interpolation method to determine the corresponding gray level of the scanned object pixel sensor 1.

In a preferred embodiment, if the value $I_x$ of the scanned object is greater than $I_{255}$, the corresponding gray level x of the scanned object pixel sensor 1 is set to "255"; if the value $I_x$ of the scanned object pixel sensor 1 is less than $I_0$, the corresponding gray level x of the scanned object is set to "0".

The gray level x of the scanned object pixel sensor 1 can be calculated according to the following equations:

$$x = 0 \quad (\text{if } I_x < I_0);$$
$$x = \frac{4-0}{I_4 - I_0} \times (I_x - I_0) + 0 \quad (\text{if } I_0 \leq I_x < I_4);$$
$$x = \frac{200-4}{I_{200} - I_4} \times (I_x - I_4) + 4 \quad (\text{if } I_4 \leq I_x < I_{200});$$
$$x = \frac{255-200}{I_{255} - I_{200}} \times (I_x - I_{200}) + 200 \quad (\text{if } I_{200} \leq I_x \leq I_{255});$$
$$x = 255 \quad (\text{if } I_x > I_{255}).$$

After the gray level of the pixel sensor 1 has been determined, then the rest of pixel sensors (pixel sensors 2~600) are determined in the same way.

According to the present invention, an additional gray corrective element is provided between the white and dark corrective elements, thereby three linear regions are defined to fit the transfer curve of the analog signal generated by the CIS to the corresponding gray level of the scanned object. However, the present invention is not limited to the application of only three corrective elements. More gray corrective elements with different light reflectivies can be provided between the white and dark corrective elements according to different situation, thereby the defined transfer curve could accurately approximate to the actual transfer curve. In the embodiment disclosed above, the comparison and calculation of the gray level of the scanned object is implemented inside the scanner. However, it should be clear for those skilled in the art that the comparison and calculation can also be implemented outside the scanner by an external equipment, for example, a computer.

Figure 6:
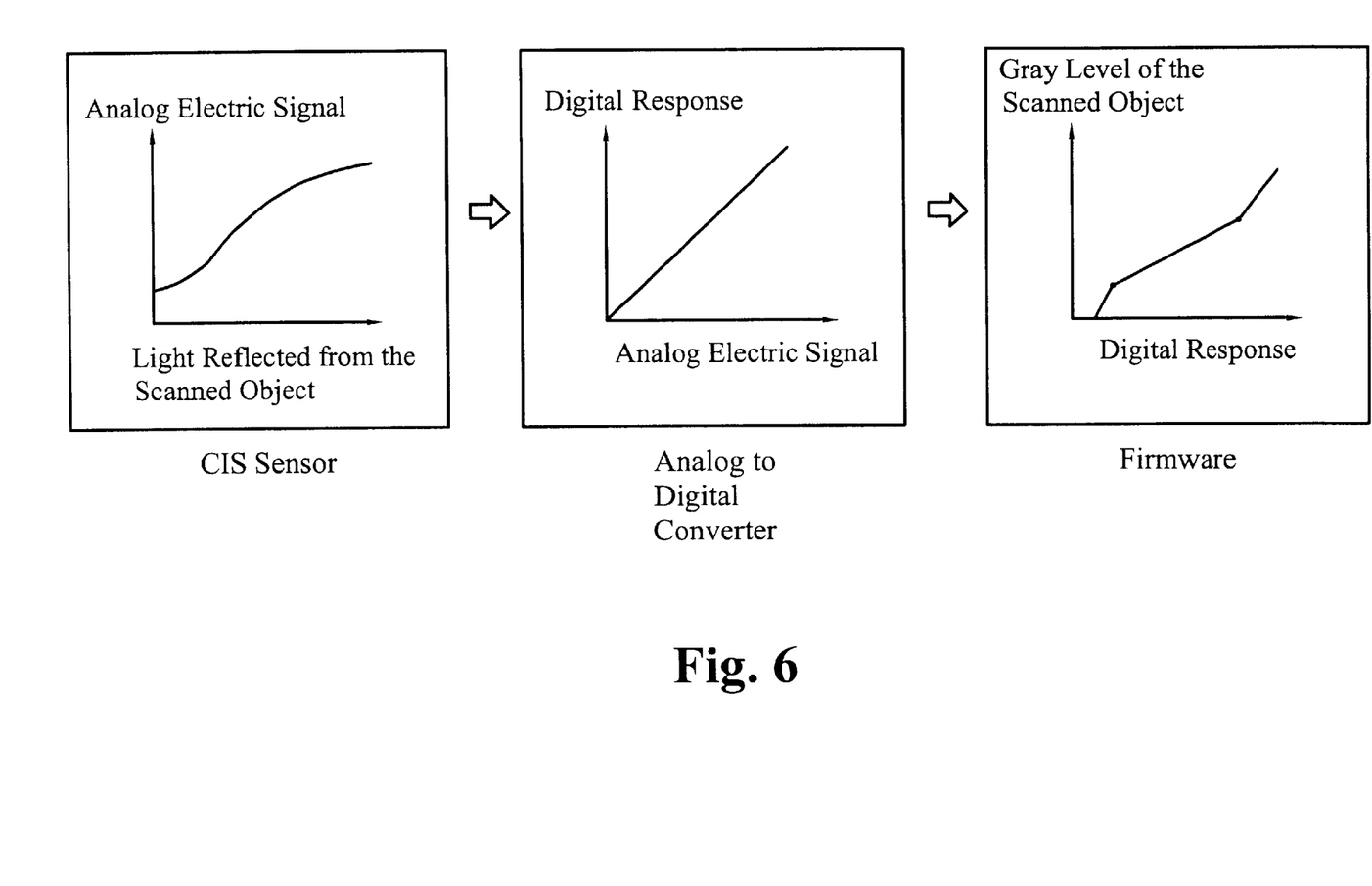
FIG. 6 illustrates the method applied for obtaining the gray level of a scanned object in a scanning apparatus according to the present invention.

In accordance with the present invention, the method for obtaining the gray level of a scanned object in a scanning apparatus has been described in detail, and its corresponding process can be schematically illustrated as FIG. 6.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of obtaining the gray level of a scanned object, comprising the steps of:

providing at least three corrective elements, wherein each of said corrective elements has different light reflectivity, and the gray levels of the said corrective elements are pre-defined and pre-stored;

scanning said corrective elements to obtain the light reflectivities of each of said corrective elements;

scanning said object to obtain its light reflectivity;

comparing the light reflectivity of said object with the light reflectivity of each of said corrective elements to determine two corrective elements whose light reflectivities are closer to the light reflectivity of said object; and using the light reflectivities of said two determined corrective elements and their corresponding gray levels in conjunction with an interpolation method to determine the corresponding gray levels of said object.

2. The method of claim 1, wherein when the light reflectivity of said object is less than the light reflectivity of any of said corrective elements, the gray level of said object is regarded the same as the gray level of the corrective element with the minimum light reflectivity.

3. The method of claim 1, wherein when the light reflectivity of said object is greater than the light reflectivity of any of said corrective elements, the gray level of said object is regarded the same as the gray level of the corrective element with the maximum light reflectivity.

4. The method of claim 1, wherein the scanning apparatus is a CIS scanner.

5. An scanning apparatus for scanning an object, at least comprising:

an image sensor module which receives a light reflected from the scanned object and generates a digital response representing the light reflectivity of said object;

at least three corrective elements having different light reflectivity, whose corresponding gray levels are pre-defined and pre-stored in the scanning apparatus; wherein during a scanning process said corrective elements will be scanned by said image sensor module and the digital response of each of said corrective elements generated by said image sensor module will be obtained; and a processing unit converting the digital response of said object into a corresponding gray level of said object according to the digital responses of said corrective elements.

6. The scanning apparatus of claim 5, wherein the scanning apparatus is a CIS scanner.

7. The scanning apparatus of claim 5, further comprising a memory for storing the value of the digital response of each of said corrective elements and the value of said object.

8. The scanning apparatus of claim 5, wherein said processing unit compares the digital response of said object with the digital response of each of said corrective elements to determine two corrective elements whose digital responses are closer to the digital response of said object, and utilizes the light reflectivities of said two determined corrective elements and their corresponding gray levels in conjunction with the interpolation method to determine the corresponding gray level of said object.

9. The scanning apparatus of claim 8, wherein when the digital response of said object is less than the digital response of any of said corrective elements, the gray level of said object is regarded the same as the gray level of the corrective element with the minimumdigital response.

10. The scanning apparatus of claim 9, wherein the scanning apparatus is a CIS scanner.

11. The scanning apparatus of claim 9, further comprising a memory for storing the value of the digital response of each of said corrective elements and the value of the digital response of said object.

12. The scanning apparatus of claim 8, wherein when the digital response of said object is greater than the digital response of any of said corrective elements, the gray level of said object is regarded the same as the gray level of the corrective element with the maximum digital response.

13. The scanning apparatus of claim 8, wherein the scanning apparatus is a CIS scanner.

14. The scanning apparatus of claim 8, further comprising a memory for storing the value of the digital response of each of said corrective elements and the value of the digital response of said object.

15. A method of obtaining the gray level of a scanned object in response to a digital response generated by an image sensor module, said image module has a non-linear transfer curve to convert a received light into said digital response, said transfer curve has a first deviated node, said method comprising the steps of:

obtaining a minimum digital response generated by said image sensor module by making said image sensor sense no light, the corresponding gray level of said minimum digital response being defined as a minimum gray level;

providing a first corrective element whose gray level being defined as a maximum gray level, and a first digital response being generated by said image sensor module when scanning said first corrective element;

providing a second corrective element whose gray level being corresponding to said first deviated node of said transfer curve, and a second digital response being generated by said image sensor module when scanning said second corrective element;

scanning said object to obtain an object digital response generated by said image sensor module;

selecting two digital responses from the minimum, first, and second digital responses, wherein the values of the two selected digital responses are closer to the object digital response; and using the object digital response, two selected digital responses, and the gray levels corresponding to the selected digital responses in conjunction with an interpolation method to determine the corresponding gray levels of said object.

16. The method of claim 15, wherein when the digital response of said object is less than minimum digital response, the gray level of said object is regarded the same as the minimum gray level.

17. The method of claim 15, wherein when the digital response of said object is greater than the maximum digital response, the gray level of said object is regarded the same as the maximum digital response.

18. A method of determining the gray level of a scanned object in response to a digital response generated by an image sensor module, said image sensor module has a non-linear transfer curve to convert a received light into said digital response, said transfer curve has a first deviated node and a second deviated node, said method comprising the steps of:

obtaining a minimum digital response generated by said image sensor module by making said image sensor sense no light, the corresponding gray level of said minimum digital response being defined as a minimum gray level;

providing a first corrective element whose gray level being defined as a maximum gray level, and a first digital response being generated by said image sensor module when scanning said first corrective element;

providing a second corrective element whose gray level being corresponding to said first deviated node of said transfer curve, and a second digital response being generated by said image sensor module when scanning said second corrective element;

providing a third corrective element whose gray level being corresponding to said second deviated node of said transfer curve, and a third digital response being generated by said image sensor module when scanning said second corrective element;

scanning said object to obtain an object digital response generated by said image sensor module;

selecting two digital responses from the minimum, first, second, and third digital responses, wherein the values of the two selected digital responses are closer to the object digital response; and using the object digital response, two selected digital responses, and the gray levels corresponding to the selected digital responses in conjunction with the interpolation method to determine the corresponding gray levels of said object.

19. The method of claim 18, wherein when the digital response of said object is less than minimum digital response, the gray level of said object is regarded the same as the minimum gray level.

20. The method of claim 18, wherein when the digital response of said object is greater than the maximum digital response, the gray level of said object is regarded the same as the maximum digital response.

* * * * *